United States Patent [19]

Brunson

[11] Patent Number: 4,996,704
[45] Date of Patent: Feb. 26, 1991

[54] ELECTRONIC MESSAGING SYSTEMS WITH ADDITIONAL MESSAGE STORAGE CAPABILITY

[75] Inventor: Gordon R. Brunson, Broomfield, Colo.

[73] Assignee: AT&T Bell Laboratories, Murray Hill, N.J.

[21] Appl. No.: 414,884

[22] Filed: Sep. 29, 1989

[51] Int. Cl.⁵ .................... H04M 3/50; H04M 11/00
[52] U.S. Cl. ........................................ 379/67; 379/88; 379/94; 379/100; 379/245
[58] Field of Search ............... 379/88, 67, 89, 100, 379/93, 94, 97, 245, 246

[56] References Cited

U.S. PATENT DOCUMENTS

| | | | |
|---|---|---|---|
| 4,720,848 | 1/1988 | Akiyama | 379/88 |
| 4,757,267 | 7/1988 | Riskin | 379/113 |
| 4,790,003 | 12/1988 | Kepley et al. | 379/88 |
| 4,825,460 | 4/1989 | Carter et al. | 379/67 |

Primary Examiner—Thomas W. Brown
Attorney, Agent, or Firm—David R. Padnes

[57] ABSTRACT

The present electronic messaging system allows a system subscribed to record a plurality of "customized" announcement messages. Each such message is associated with at least one calling party. Upon receiving an incoming communication for that subscriber, the system automatically utilizes the calling party identification for that communication to retrieve the associated customized announcement message. The calling party identification, which identifies the communication instrument utilized by the calling party, is automatically provided to the electronic messaging system by the communications network through which the incoming communication is routed.

20 Claims, 5 Drawing Sheets

ELECTRONIC MESSAGING SYSTEMS WITH ADDITIONAL MESSAGE STORAGE CAPABILITY

TECHNICAL FIELD

The present invention relates to electronic messaging systems which communicate a stored announcement message upon receiving a call for a system subscriber and, more specifically, to such a system which permits "customized" announcement messages to be stored and communicated based on an identification of the equipment through which the call was transmitted.

BACKGROUND OF THE INVENTION

Electronic messaging systems are systems wherein messages between two or more parties may be communicated and stored for later retrieval by the message recipient. The form of the communicated messages may be voice or data, the latter being virtually limitless and including facsimile, video and text. A typical scenario in such systems is that a call to the system subscriber is received by the system which, in response thereto, transmits a prestored message or announcement to the calling party. The calling party then has the opportunity to leave a message for the system subscriber.

One feature of electronic messaging systems, which encompass voice messaging systems, such as answering machines, as well as text and facsimile messaging systems, is that it is not required that the calling party and the system subscriber or called party both be present at the time the message is communicated. This feature can be a boon in certain situations and can also create problems in other situations. One such problem arises when a called party does not leave an adequate announcement message. For example, the most prevalent message left in voice messaging systems is not "customized" and is the same for any calling party. One commonly used message is one where the called party states that he or she is presently unavailable and will return any calls if the caller's name and telephone number are communicated to the messaging system. This often results in a significant amount of "telephone tag" wherein each caller repeatedly misses reaching the other and leaves his or her name and telephone number in the voice messaging system.

One solution to the above-referenced problem of telephone tag is to provide a personalized message for each of a number of different calling parties. Each of these messages is retrievable upon the entering of a password by the calling party. See, for example, U.S. Pat. No. 4,571,458, issued to Bond on Feb. 18, 1986. While this solution solves the problem, its shortcoming is that each calling party needs to remember their associated password and the password must be assigned to each calling party prior to leaving any message.

SUMMARY OF THE INVENTION

The present invention relates to an electronic messaging system which allows a system subscriber to record a plurality of "customized" announcement messages. Each such message is associated with at least one calling party. Upon receiving an incoming communication for a system subscriber, the system automatically utilizes the calling party identification for that incoming communication to retrieve any associated customized message. Advantageously, the calling party identification, which identifies the communication instrument utilized by the calling party, is automatically provided to the electronic messaging system by the communications network through which the incoming communication arrived.

DETAILED DESCRIPTION

Figure 1:
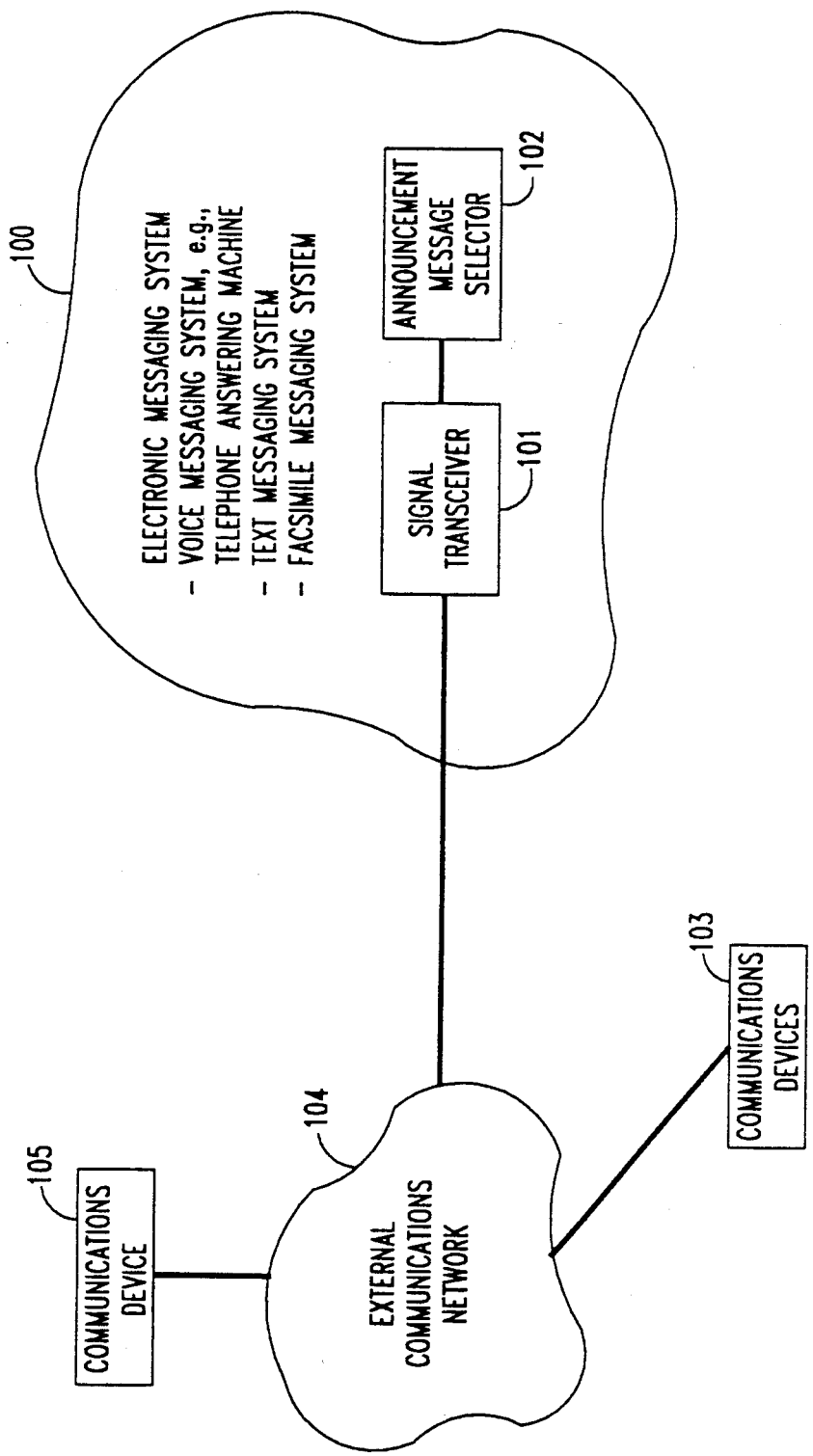
FIG. 1 is a block diagram which illustrates the principles of the present invention.

As shown in FIG. 1, electronic messaging system 100, including a signal transceiver (transmitter/receiver) portion 101 and announcement message selector portion 102, provides electronic messaging services for at least one communications device 103. Such messaging services include voice messaging, text messaging and facsimile messaging. Device 103, which can be any of a variety of types, such as station sets, personal computers, data terminals, facsimile machines, etc., is connected to electronic messaging system 100 via external communications network 104 in well-known fashion. In a typical situation, incoming communications for device 103 can be redirected to electronic messaging system 100 which, in response thereto, provides an announcement message and the capability of storing a reply message, the latter using message storing apparatus not shown. The incoming communications for one communications device 103 can originate from either another communications device similar to device 103 (not shown) which is also provided with messaging services by electronic messaging system 100 or from at least one communications device 105 which can encompass the same variety of equipment types as device 103 but which is not provided with messaging services by electronic messaging system 100. As will be discussed, hereinbelow, pursuant to the present invention, electronic messaging system 100 is provided with the capability of providing announcement messages which are a function of both an identification of the called communications device as well as an identification of the calling communications device. Both of these identifiers are automatically provided to signal transceiver 101 by external communications network 104. The received identifiers are then coupled to message selector 102 which selects the appropriate announcement message in response to the received identifiers.

Figure 2:
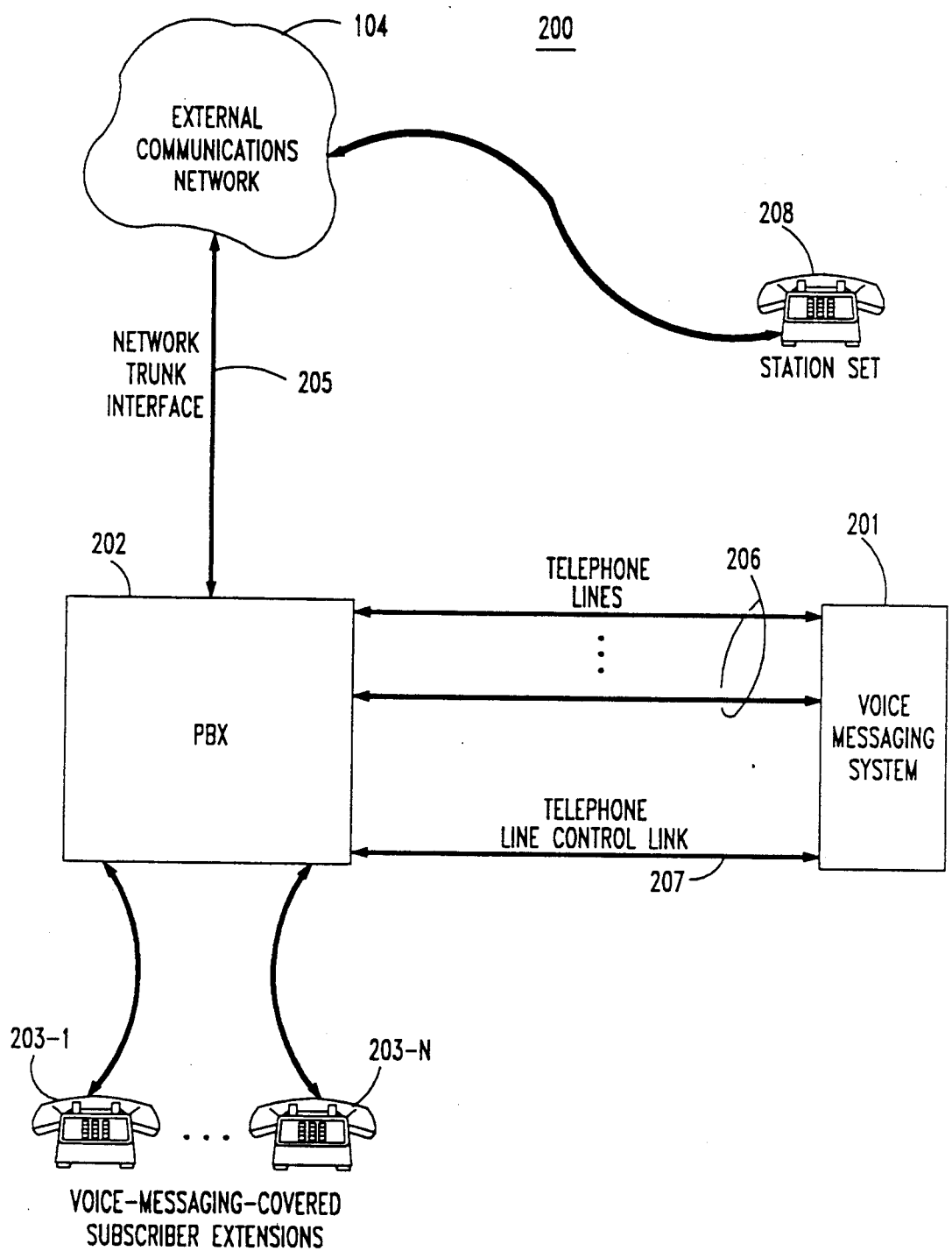
FIG. 2 is a block diagram of a communications system 200 embodying the principles of the present invention.

Refer now to FIG. 2. Voice messaging system 201 is integrated with a private branch exchange switch (PBX) 202 to provide answering machine and voice messaging services for any of a plurality of subscriber station sets 203-1 through 203-N connected to the PBX. PBX 202 interconnects these station sets along with a myriad of other communications devices (not shown), such as personal computers, video terminals, environmental sensing devices, such as smoke and fire detectors, facsimile machines, etc., to external communications network 104. Network 104 may be a public network, private network or both and may include other PBXs so as to provide a network of interconnected PBXs. Interconnection between the PBX and the external communications network is provided via network trunk interface 205 and interconnection to the voice messaging system is provided via one or more telephone lines 206 and telephone line control link 207. Each of lines 206 routes an individual call to the voice messaging system while link 207 conveys ancillary information about the call to the voice messaging system.

When a call is made from a station set 208, which is external to PBX 202, to a voice-messaging-covered one of station sets 203-1 through 203-N, the call comes into the PBX via a network trunk interface and is routed through the PBX by call processing software therein to the designated station set where ringing occurs. If the call is not answered within a predetermined number of rings or if the extension is busy, the call processing software within the PBX redirects the call to voice messaging system 201 via an available one of telephone lines 206. In conjunction with this redirection, a control message is sent through the telephone line control link 207 to the voice messaging system. This control message includes the extension number of the station set for which the call was intended, the reason for the redirection, i.e., busy, no answer, out-of-service, etc., and the telephone number of station set 208 which is commonly referred to as the calling party identification. The voice messaging system uses this control information to determine how to answer the call. In the most common scenario, the voice messaging system will use the calling and called party identifications to find a stored announcement message which has been pre-recorded and stored within the voice messaging system. This announcement message will then be used to answer the call. After playing the announcement message, a beep tone is played to indicate that the voice messaging system is recording any message from the calling party. When the calling party hangs up, the recorded message from that party is stored in the voice messaging system and is retrievable at a later time by the called party. The voice messaging system also sends message-waiting information back to the PBX which is typically used to illuminate the message waiting lamp on the called party's station set. As a result, the called party knows that there is a message to be retrieved.

It should, of course, be understood that while the present invention has been described in relation to a call originating from a station set external to PBX 202, the same scenario is applicable to calls originating from station sets directly connected to PBX 202 as well as station sets connected to other PBXs which are interconnected to PBX 202 via external communications network 104.

Figure 3:
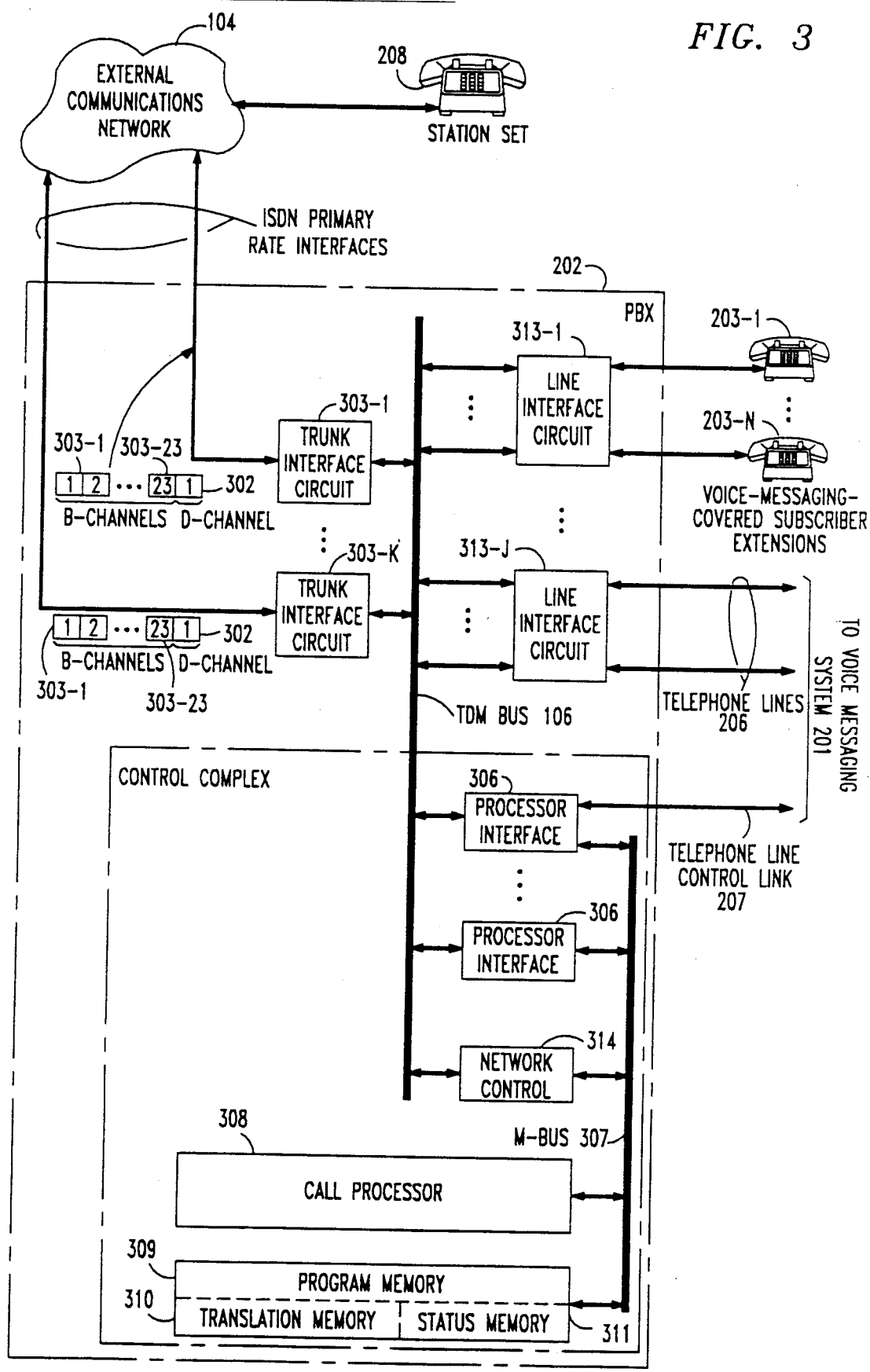
FIG. 3 is a block-schematic diagram of the PBX of FIG. 2.

FIG. 3 shows an Integrated Digital Services Network (ISDN) environment wherein PBX 202 is connected to external network 104 via one or more ISDN primary rate interfaces. Each of these interfaces, which includes 23 primary bearer channels (B-channels), designated as 301-1 through 301-23, and one primary data channel (D-channel), is connected to time-division multiplex (TDM) bus 304 via one of a plurality of trunk interface circuits 303-1 through 303-K. Each D-channel carries signaling information for one or more B-channels and this D-channel may or may not terminate on the same trunk interface circuit as its associated B-channels.

Control of the routing of each B-channel in the PBX is provided by standardized messages coupled by the associated D-channel. One of these messages, referred to as a SETUP message, provides specific information relating to a requested use of a B-channel and includes the called party number and the calling party number. Accordingly, when a call is placed from station set 208 to a called party number which is an extension on the PBX, e.g., station set 203-1, a SETUP message for this call is first routed to the PBX and is coupled through one of the trunk interface circuits 303-1 through 303-K to TDM bus 304. Bus 304 carries the SETUP message to one of the processor interface circuits 306. Each circuit 306 contains specific logic to terminate layer two of the ISDN protocol and couples the SETUP message via memory bus (M-bus) 307 to call processor 308. Program memory 309 stores the necessary instructions which are used by call processor 308. Memory 309 is subdivided into two sections—translation memory 310 which stores translation and redirection data and status memory 311 which stores the current status of all of the PBXs, lines, trunks and associated equipment.

Assuming that the requested communication in the SETUP message can be fulfilled, a B-channel is allocated to this call and setup of the call proceeds via control messages which are coupled between line interface circuit 313-1 and network control 314. Voice communications between the calling party and called party are established once the called party goes off-hook. If, however, the called party's phone is busy or unanswered for a certain time period, the call processor routes the call to voice messaging system 201. This routing is accomplished by connecting the assigned B-channel for the call to one of the one or more line interface circuits, designated as 313-1 through 313-J for which an available telephone line 206 exists. Such availability is determined by data stored in translation memory 310 and status memory 311. Each line interface circuit provides the necessary analog-to-digital (A/D) signal conversion and vice versa required between the B-channel and the voice messaging system. The call processor also couples the required information in the SETUP message, such as the calling party identification and called party digits, to the voice messaging system via one of the one or more processor interface units 306 which are directly connected to voice messaging system 201.

Figure 4:
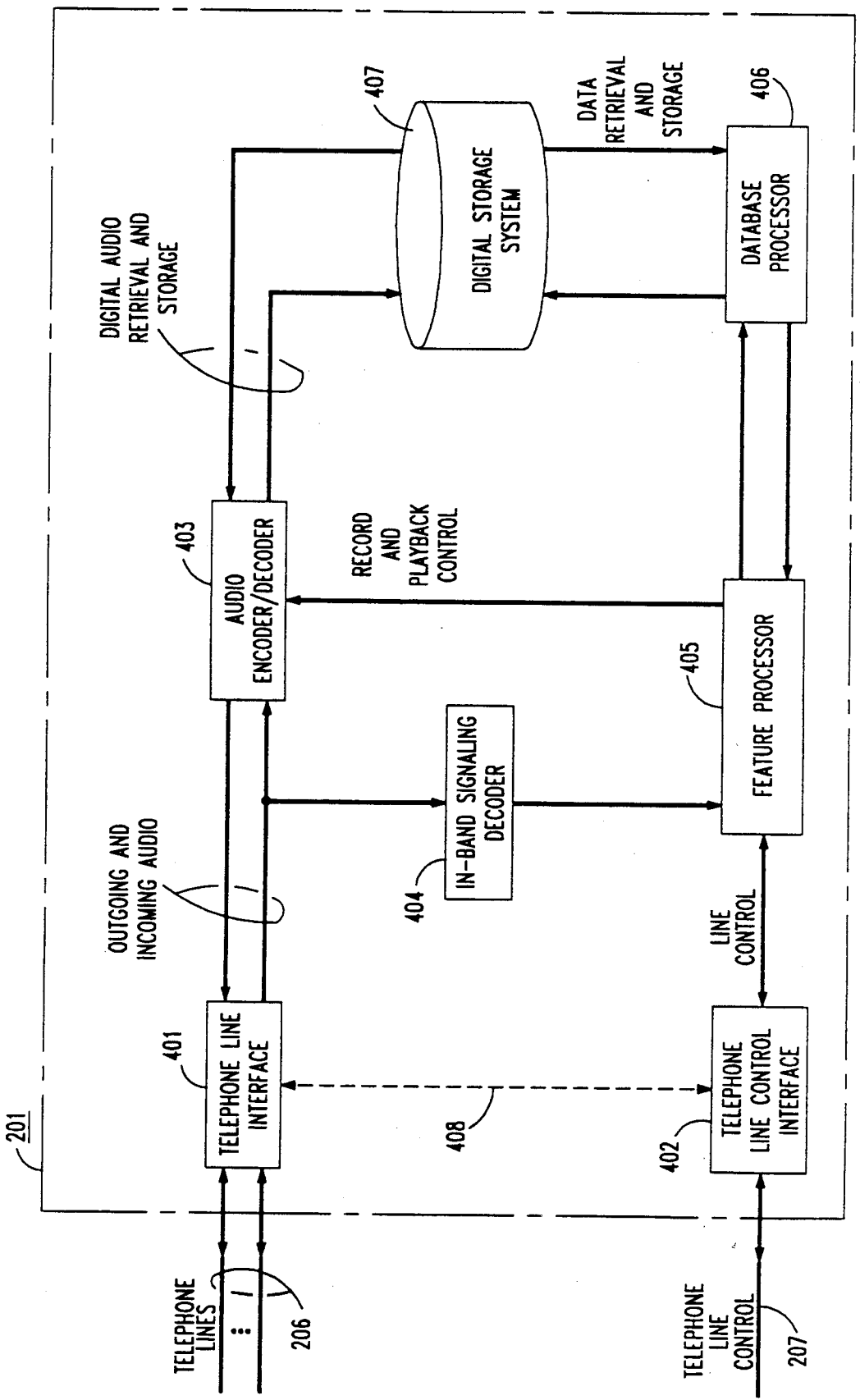
FIG. 4 is a block-schematic diagram of the voice messaging system of FIG. 2.

Refer now to FIG. 4. Voice messaging system 201 includes telephone line interface 401, telephone line control interface 402, audio encoder and decoder 403, in-band signaling decoder 404, feature processor 405, database processor 406 and digital data storage system 407. Each redirected call from PBX 202 via one of telephone lines 206 is coupled through telephone line interface 401. The format on telephone lines 206 may be any of a number of wellknown arrangements, such as tip-ring, T1, ISDN Basic Rate Interface (BRI) or Primary Rate Interface (PRI) or, for that matter, any proprietary format. Interface 401 provides the necessary signal translation for information signals, e.g., messages to be recorded or played back, system announcements and instructions to the calling party, etc., passing between the telephone lines and the voice messaging system. When any call control information originates from interface 401, it is coupled to telephone line control interface 402 via link 408. Interface 402 provides the logical interface for out-of-band call control information. In the simplest case, it differentiates between the various states of the telephone line such as on-hook, off-hook, addressing, talk, hang-up and ringing and can receive information on the call destination, and on whether or not the call has been previously redirected, and the reason for such redirection. Moreover, in accordance with the present invention, line control interface 402 can also receive information on the source of the call. Interface 402 may be connected to one or more line control links 207.

Audio encoder/decoder 403 couples incoming and outgoing audio information between telephone line interface 401 and digital storage system 407. During recording of a message, encoder/decoder 403 prepares the audio material for storage and couples the result to digital storage system 407. System 407 can be RAM, disk or tape based. During message playback, encoder/decoder 403 retrieves information from storage system 407 and regenerates the originally recorded audio information which is then coupled through interface 401 to one of telephone lines 206. The recording and playback modes are under the direct control of feature processor 405. The various types of information stored in system 407 are uniquely identified by storage keys. These keys are maintained along with associated program information by data processor 406.

Voice messaging system 201 also includes in-band signal decoder 404 which is coupled to the output of telephone line interface 401 to monitor this output for the presence of calling-party-generated signaling information. When such information is detected, it is decoded and passed to the feature processes stored in feature processor 405 in the form of control tokens. These tokens may represent control commands such as begin recording, end recording, etc., or they may represent data such as a telephone number or an identification number.

Feature processor 405 utilizes one or more processes, under stored program control, to implement the service features of the voice messaging system. Similarly, database processor 406 employs one or more processes, under stored program control, to manage the storage and retrieval of data for feature processor 405. The data managed is that stored in data storage system 407 and includes subscriber data, system data, traffic and maintenance information, and voice data for announcements and messages. The database processes work together to insert, sort delete, queue and return information to the feature processes which, in turn, implement a specified feature. For example, when a user calls directly into the system to retrieve his or her messages, the database processes return to the feature processes an ordered list of message headers which contain information about each of the messages to be played out, such as message originator, message creation time, type of call, etc., along with the storage keys for the messages themselves.

Figure 5:
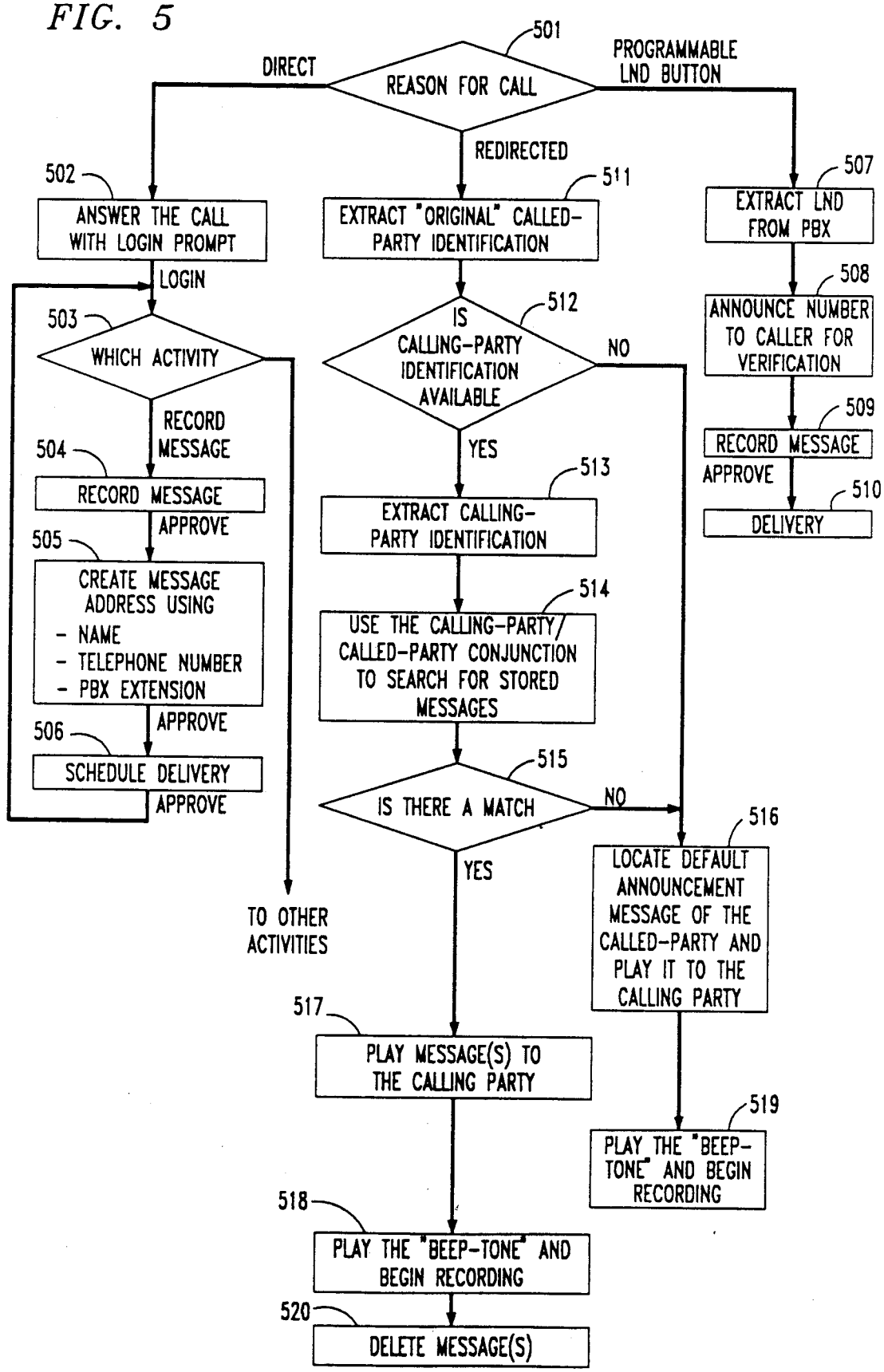
FIG. 5 is a flowchart of the operations performed by the voice messaging system of FIG. 2 in accordance with the present invention.

FIG. 5 depicts in flow diagram form the sequence of operations which are performed in order to create and play-back a message in accordance with the present invention. When voice messaging system 201 receives a call, it first determines at operation 501 if the call was a direct call to the voice messaging system, i.e., the calling party dialed the extension of the voice messaging system on PBX 201. If so, the voice messaging system answers the call, as shown by operation 502, with a login prompt scenario during which the calling party logs in to the voice messaging system and selects activities or options from a menu. One of these activities is to record a message. If this activity is selected, as indicated by an output of operation 503, then the caller hears a prompt to press a button on the station set when the recording is finished and to begin recording upon hearing a tone in the station set handset. The recording session then begins, as shown by operation 504, and includes editing capabilities, such as stopping and restarting, reviewing, deleting and appending to the recording. When the calling party is satisfied with the recording, the recording is approved.

At operation 505, a message address is created and this address includes the identification of the party for whom the message is intended. This identification, pursuant to the present invention, is the telephone number of a communication instrumentality associated with a particular calling party. In certain situations, as where the intended message recipient is known to the voice messaging system, as is the case where the calling party is a subscriber to the voice messaging system, the message recorder may enter the name of the intended message recipient or his or her telephone number or his or her PBX extension. Any of these three addressing modes operates as a calling party identification. Of course, more than one calling party identification may be entered. For example, a range of telephone numbers may be used. This would allow the created message to be played for calls originating from any one of several consecutively numbered telephone lines, such as is the case for certain key telephone system applications. Multiple nonconsecutive telephone numbers or PBX extensions and multiple names may also be entered using predefined lists or by enumerating each number, extension, or name individually.

Differentiation between name, telephone number and PBX extension is provided by the use of predefined and distinct address mode identifiers. For example, depressing station sets buttons *1, *2 or *3 can be used to respectively designate that the subsequent entered information represents a name, a telephone number or a PBX extension.

After the message recorder approves the message addressing, the completed message is scheduled for delivery, as shown by operation 506. Scheduling a message for delivery means that a time and date for the voice messaging system to begin using the message has been specified. By default, immediate delivery of the message can be implemented. Once the delivery is scheduled and approved, the message recorder is returned to the activity menu and the message creation activity is completed.

The present invention also preferably provides the ability to record a message after a user has dialed a particular telephone number and was unable to reach the called party. In this situation, the calling party, after a call does not reach the called party, presses a programmable last number dialed (LND) button on his or her station set. In response thereto, PBX 202 accesses status memory 311, shown in FIG. 3, to obtain the LND for the station set. The PBX then connects the voice messaging system to the station set on one of telephone lines 206. The last number dialed from the station set, i.e., the number of the called party that was not reached, is forwarded to the voice messaging system via control link 207. The voice messaging system then announces this number to the caller for verification. These steps are indicated by operations 507 and 508. The calling party can then record a message with edit capability as shown by operation 509. After approval of the recorded message, the message is delivered as indicated by operation 510. It should be noted that in this message creation scenario it is not necessary for the calling party to create the message address since the voice messaging system knows both the calling and called party identification.

Retrieval of messages from voice messaging system 201 is shown by operations 511–520. When the voice messaging system receives a call as a result of redirection by the PBX, the system extracts the called and calling party identification in operations 511 through 513. Using this information as a database key, the stored messages in digital storage system 407 are searched for a matching address pair. This is indicated by operation 515. If such a matching address is found, the associated message is played back to the calling party, as shown by operation 517. If, however, a matching address is not found, then the voice messaging system, as shown by operation 516, locates the default announcement message for the called party and plays this message back to the calling party. In either case, the calling party, after hearing the customized or default message, has the opportunity to record a reply message as indicated by operation 518 and 519. At operation 520, messages played back to the calling party are deleted and are not heard on subsequent calls by such parties. If the playback is interruped, such deletion is inhibited. In addition, messages not played back to a specified calling party within a predetermined time are automatically deleted.

It should, of course, be understood that while the present invention has been described in reference to particular applications, other arrangements should be apparent to those of ordinary skill in the art. For example, while the detailed description primarily focuses on the present invention embodied within a voice messaging system in a PBX environment, the present invention is applicable to other voice messaging systems, such as answering machines, which are directly connected to a communications network. This implementation would merely require that telephone line 206 and telephone line control link 207 be integrated into a single communications interface such as that which exists in the ISDN BRI interface. In addition, the present invention is also applicable to other electronic messaging systems including electronic text and facsimile messaging systems. In an electronic text application, the station sets would be replaced by data terminals and the information communicated between the calling data terminal and the called data terminal would be analog or digital data (nonvoice) signals. In a facsimile messaging application, the station sets would be replaced by facsimile machines and the invention would automatically transmit prestored information via facsimile upon receiving an incoming facsimile message from a previously identified facsimile terminal which is associated with the prestored information.

I claim:

1. Apparatus for use in an electronic messaging system which interfaces with a communications network, said system providing announcement message for incoming communications from calling parties to at least one system subscriber, said apparatus comprising
   means for receiving an incoming communication destined for a given system subscriber, said communication including an identification of communications equipment being utilized by a calling party, and
   means for selecting a particular one of said announcement messages in response to said identification, said particular announcement message being selected from a plurality of different announcement messages associated with said given system subscriber.

2. The apparatus of claim 1 wherein said identification is at least one telephone number associated with the communications equipment being utilized by said calling party.

3. The apparatus of claim 1 wherein said identification is at least one PBX extension associated with the communications equipment being utilized by said calling party.

4. The apparatus of claim 1 wherein said identification is at least one name associated with the communications equipment being utilized by said calling party.

5. The apparatus of claim 1 further including means for forming said announcement messages in response to input from said system subscriber.

6. Apparatus for use in an electronic messaging system which interfaces with a communications network, said system providing announcement messages for incoming communications from calling parties to at least one system subscriber, said apparatus comprising
   means for receiving an incoming communication, said communication, at times, including an identification of communications equipment being utilized by a calling party, and
   means for selecting a particular one of said announcement messages in response to said identification and for selecting a default announcement message when said identification is absent.

7. The apparatus of claim 1 further including means for converting said particular announcement message to a voice signal.

8. The apparatus of claim 1 wherein said electronic messaging system is a voice messaging system.

9. The apparatus of claim 1 wherein said electronic messaging system is a text messaging system.

10. The apparatus of claim 1 wherein said electronic messaging system is a facsimile messaging system.

11. The apparatus of claim 1 wherein said electronic messaging system is a telephone answering system.

12. The apparatus of claim 1 wherein said incoming communication is first received by communications apparatus which is coupled to said network and is then redirected to said receiving means.

13. The apparatus of claim 1 further including means for storing said announcement messages in a manner which allows selection of said particular announcement message by said selecting means.

14. The apparatus of claim 13 further including means for deleting any announcement message stored by said storing means which is not selected in a predetermined time period.

15. The apparatus of claim 1 further including means for transmitting said particular announcement message.

16. The apparatus of claim 15 further including means for deleting said particular announcement message after it is transmitted.

17. A method for use in an electronic messaging system which interfaces with a communications network, said system providing announcement messages for incoming communications from calling parties to at least one system subscriber, said method comprising the steps of
   receiving an incoming communication destined for a given system subscriber, said communication including an identification of communications equipment being utilized by a calling party, and selecting a particular one of said announcement messages in response to said identification, said particular announcement message being selected from a plurality of different announcement messages associated with said given system subscriber.

18. The apparatus of claim 1 wherein said incoming communication further includes an identification of said system subscriber when said electronic messaging system provides announcement messages for more than one system subscriber and said selecting means is also responsive to said system subscriber identification.

19. The apparatus of claim 6 wherein said incoming communication further includes an identification of said system subscriber when said electronic messaging system provides announcement messages for more than one system subscriber and said selecting means is responsive to said system subscriber identification.

20. The method of claim 17 wherein said received incoming communication further includes an identification of said system subscriber when said electronic messaging system provides announcement messages for more than one system subscriber and said selecting step is also responsive to said system subscriber identification.

* * * * *